March 1, 1938. F. E. WOODARD 2,109,983
BICYCLE MECHANISM
Filed Oct. 12, 1936 2 Sheets-Sheet 1

Inventor
F. E. Woodard
By Arthur H. Sturges
Attorney

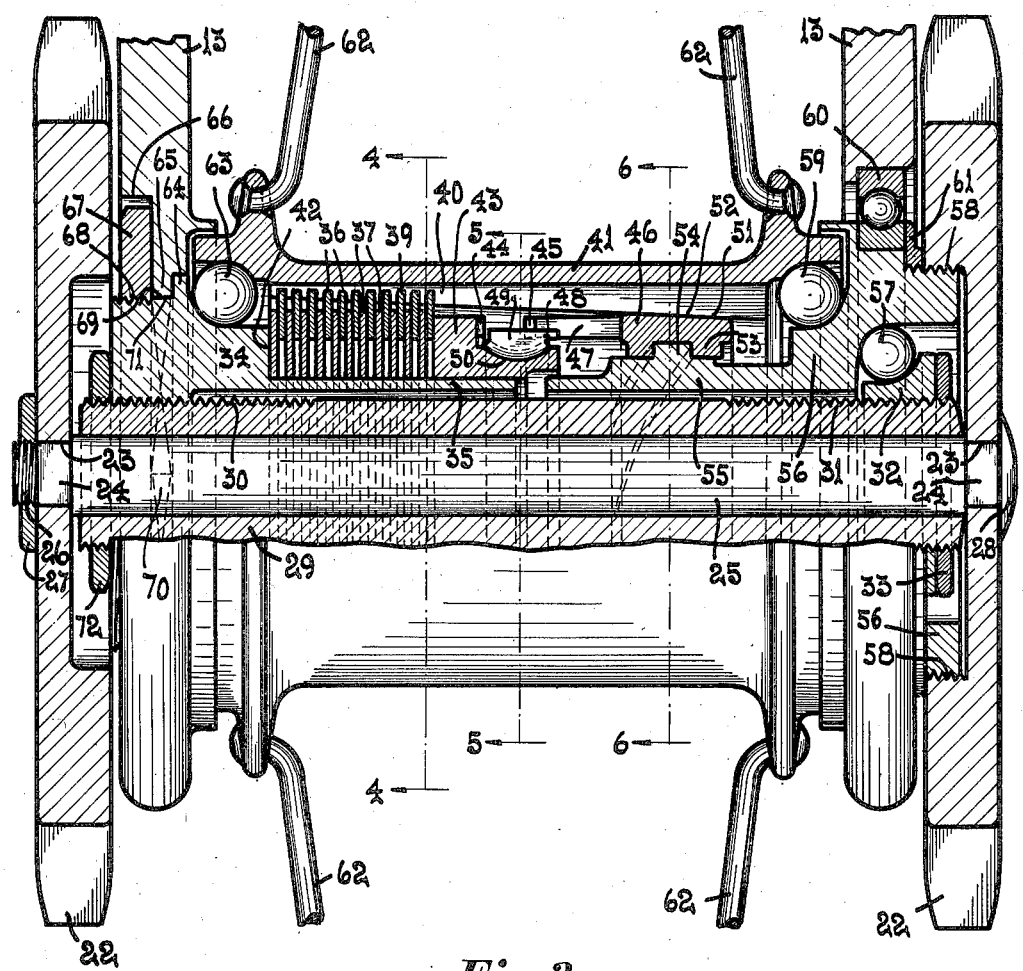
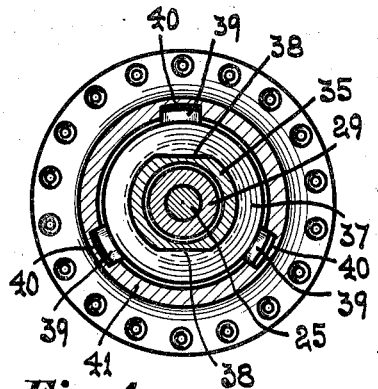
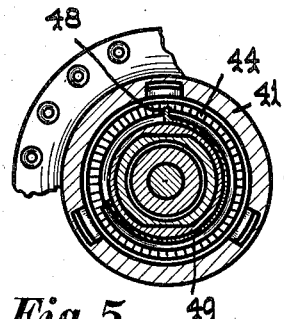
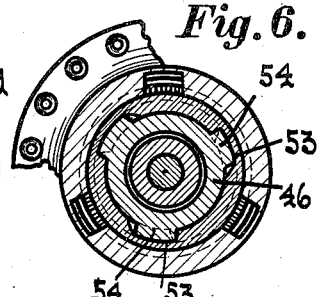

Patented Mar. 1, 1938

2,109,983

UNITED STATES PATENT OFFICE 2,109,983

BICYCLE MECHANISM

Fred E. Woodard, Omaha, Nebr.

Application October 12, 1936, Serial No. 105,214

6 Claims. (Cl. 192—6)

This invention relates to wheeled vehicles and more particularly to bicycles and has for an object to so arrange the parts of a bicycle that the latter is comparatively economical in construction.

Another object of the invention is to provide a gearing adapted for mounting on the front forks for propelling of the front wheel of a bicycle for traction purposes in a manner whereby higher speeds than heretofore may be obtained in proportion to the number of revolutions required to be applied by the operator's foot for driving the bicycle.

A further object of the invention is to provide a new construction of coaster brake and driving mechanism which is particularly adapted for use in connection with a bicycle, the front wheel of which is used for traction.

A still further object of the invention is to provide a coaster brake mechanism for a bicycle so arranged that both pedals of the bicycle are both used for directly applying tractive force directly to said mechanism and to the traction wheel of a bicycle without the use of sprocket chains or connecting links as heretofore practiced in the art.

Other and further objects and advantages of the invention will be understood from the following detailed description thereof, reference being had to the accompanying drawings in which:

Figure 3 is a front elevation partly in section of the coaster brake propelling mechanism.

Figure 4 is a transverse section on a reduced scale taken on line 4—4 of Figure 3.

Figure 1:
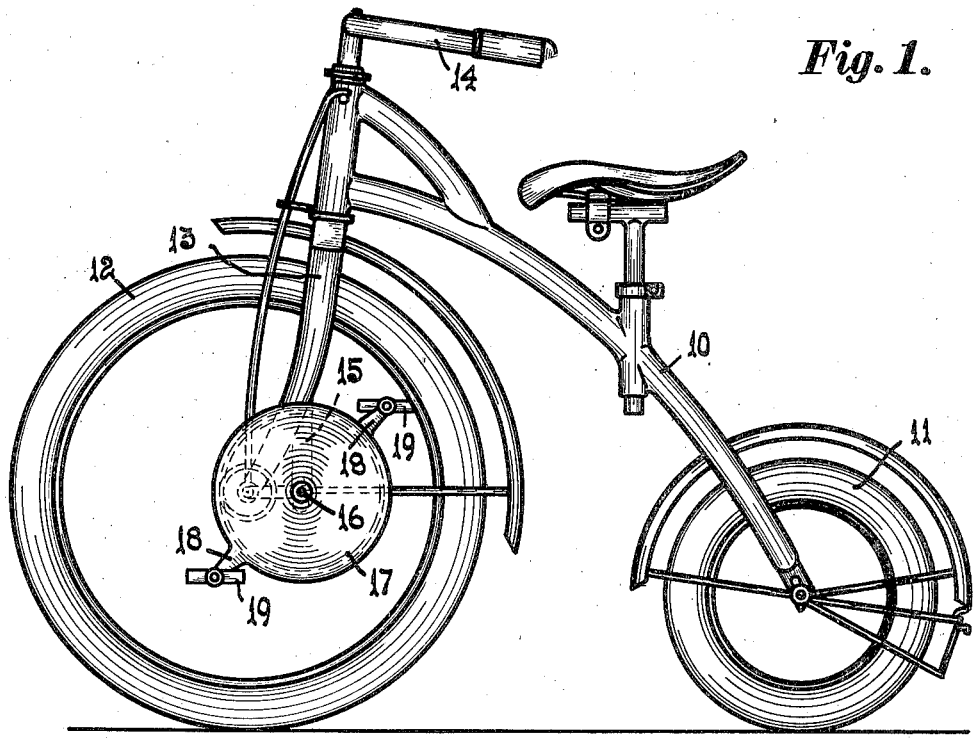
Figure 1 is a side elevation of a bicycle embodying the present invention.
Figure 2:
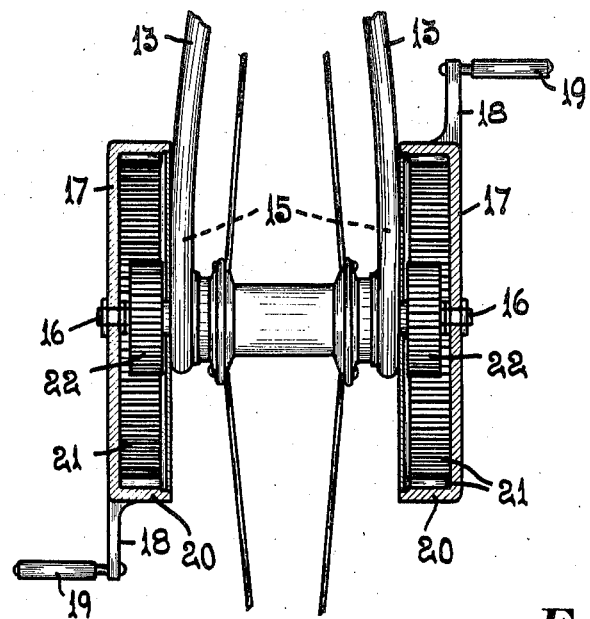
Figure 2 is a fragmentary view of the front forks and wheel of the bicycle, certain driving housings employed showing in section, with the hub of the new coaster brake mechanism applied thereto.

Figures 5 and 6 are fragmental transverse sections taken respectively on lines 5—5 and 6—6 of Figure 3.

Heretofore in the art both pedals of a bicycle have been used to apply tractive force to a sprocket wheel and chain, the latter in turn communicating said force to a rear wheel of a bicycle through a coaster brake mechanism and it is an object of the present invention to eliminate said chain and its objectionable features whereby the cost of bicycles is lessened and operating efficiency increased. Also heretofore in the art tractive force has been applied directly to the front wheels of bicycles as is illustrated and described in Patents Nos. 592,169; 627,351 and 399,285 which do not teach the use of coaster brake driving mechanism for front wheels.

Referring now to the drawings for a more particular description, 10 indicates the frame of the bicycle to which is pivotally secured a rear wheel 11 for supporting the rear end of said frame, the latter being supported forwardly by a front wheel 12 mounted between the forks 13. Preferably the rear wheel is of less diameter and cost than the front wheel. The vehicle is provided with steering handle bars 14 which are operated in a well known manner.

The front forks 13 of the vehicle are each provided with a downwardly extending arm 15 joined to each fork at a point between the ends of said forks for the purpose of providing a mounting on each fork of outwardly extended stub axles 16 which provide pivotal mountings oppositely disposed for driver housings 17, the latter each being provided with an outstanding pedal arm 18 to each of which a pedal 19 is pivotally secured.

The interior of the housings 17 are preferably enclosed and on the inner annular wall of the flange 20 of each housing 17 are provided annularly disposed gear teeth 21, the latter together with the housing wall 17 and the arms 18 thereof preferably being formed of integral construction.

The forward lower ends of the forks 13 support therebetween the new coaster brake and driving mechanism for the front wheel 12, said mechanism being provided with an auxiliary axle which functions as the axis of said front wheel.

The new coaster brake mechanism is similar in many respects to the "New Departure Model D" coaster brake and differs therefrom primarily by the provision of an additional axle-sleeve of hollow type whereby a front wheel coaster brake drive for a bicycle is provided which also employs pedals for a direct application of tractive force to the front wheel of the bicycle.

The coaster brake mechanism of the present invention includes oppositely disposed pinions 22 which are constantly in mesh with the gear teeth 21 of the housings 17. At the axis of the pinions 22 each are provided with an aperture 23 which is rectangular in plan for snugly receiving the correspondingly shaped or squared ends 24 of an axle-shaft 25, the latter being of substantially greater diameter than the diameter or transverse area of the squared ends 24 thereof and adapted to revolve in unison with the pinions 22 within the later described stationary axle-sleeve 29.

Outwardly of an end of the bolt axle 25, the latter is provided with threads 26 for receiving a nut 27, the opposite end of said bolt being provided with a head 28 whereby in use the pinions 22 are each removably affixed to said bolt and it will be understood that if desired threads and a nut similar to the threads 26 and nut 27 may be provided at each end of the bolt 25.

The stationary axle-sleeve 29 of the coaster brake mechanism is provided with a longitudinally extending bore which receives the axle-bolt 25 and at opposite ends of the axle-sleeve 29 screw threads 30 and 31 are provided.

At that end of the axle-sleeve 29 adjacent to the head 28 of the axle-bolt an annularly disposed half portion 32 of a ball race is threadedly secured to the stationary axle-sleeve 29 and is provided with a keeper or lock-nut 33 whereby the member 32 is maintained stationary and adjustably carried on said axle-sleeve and is adapted to be positioned with respect thereto for accommodating variations in size of balls as the balls of the bearing thereof become worn.

At the end of the axle opposite to the member 32 a ball race member 34 is threadedly and adjustably mounted on the hollow axle-sleeve 29 and is provided with a stationary sleeve portion 35 extending towards the medial portion of the coaster brake mechanism and functions as a support for certain clutch discs annularly mounted thereon. Said clutch members include alternately disposed rotatable copper and non-rotatable steel discs respectively indicated at 36 and 37.

The stationary sleeve-portion 35 of the member 34 is provided with oppositely disposed flat parallel sides 38 as shown in Figure 4 and the walls of the apertures of the steel discs 37 are provided with a corresponding shape whereby they are prevented by the sleeve from having rotary movement, said sleeve being held stationary as later described. The copper discs 36 are each provided with a plurality of outwardly disposed integral tangs 39, three thereof preferably being employed on each copper disc, said outstanding tangs being received within and slidable with respect to notches 40, the latter having a shape transversely corresponding to the tangs, said notches being disposed longitudinally of and formed in the annular wall of a hub 41, said copper discs thereby being locked for rotary movement with the hub 41 while at the same time they are longitudinally movable or slidable with respect thereto.

By this means it will be understood that the copper discs being locked to the rotatable hub and the steel discs being locked to the sleeve 35 of the member 34 as described that at times when the discs become compressed toward and against each other that friction between oppositely disposed discs takes place for providing a braking effect as later more particularly described.

One end of the series of discs abuts an annular shoulder portion 42 of the member 34 and the opposite end of said series of discs is adapted to be compressed by a movable annulus 43 which is journalled on and slidable with respect to the sleeve-portion 35 of the member 34, whereby at times when the annulus 43 is moved towards said discs the latter become compressed for said braking effect.

The annulus 43 is provided with annularly disposed teeth 44 adjacent the perimeter and on a side face thereof which are adapted to cooperate and mesh with similarly disposed teeth 45 carried by a collar 46.

The collar 46 is provided with a slot 47 which slidingly receives the outwardly turned guide-end 48 of a guide spring 49, the latter being arcuate in cross-section and of concaved shape transversely for preventing the member 49 from moving from its normal engagement with the complemental shaped portion 50 of the annulus 43.

The outer perimeter or outer annular wall of the collar 46 is convergent as indicated at 51, said convergent wall portion of the collar normally snugly abutting against a similarly and correspondingly shaped tapered inner annular wall 52 of the hub 41.

On the inner annular wall of the collar 46 threads 53 are provided, said threads being comparatively coarse and preferably square or angular in cross section, said threads being adapted to cooperate with the threads 54 formed on the outer annular wall of a driver-coupling-sleeve 55, whereby at times when the member 55 is rotated in either direction the collar 46 is provided with corresponding movements for moving the collar longitudinally of the hollow axle-sleeve 29 and toward or away from the discs in a manner whereby the teeth 45 of the collar 46 become engaged with or disengaged from the teeth 44 of the annulus 43 for causing corresponding movement of said annulus or disengagement therefrom for the purpose of compressing the discs for causing a frictional engagement therebetween for the heretofore mentioned braking purposes, said parts being actuated by means later described.

The driver-coupling 56 which is integral with its sleeve 55 is provided with a ball race half portion and a plurality of balls 57 are annularly disposed between said portion and the ball race portion 32. The member 56 is threadedly attached as at 58 to a pinion 22 and is provided with a second ball race portion or track for carrying between the latter and the adjacent ball race portion of the hub 41 a plurality of annularly disposed balls 59.

That arm 13 of the front fork which is adjacent the head 28 of the bolt 25 is provided with anti-friction ball bearings and tracks therefor generally indicated at 60, half portions of said track or race being respectively mounted in said arm and on the member 56, said track being provided with a keeper or lock nut 61.

The hub 41 supports the front wheel through the spokes 62 thereof which may be secured to the hub by any suitable means such as shown in Figure 3.

The ball race half portion provided by the member 34 is provided with a plurality of balls 63 which are annularly disposed with respect to the member 34 and interposed between it and the adjacent end portion of the hub 41 and functions similarly to the balls 59 in supporting the hub and wheel from or upon the hollow axle-sleeve 29 of the coaster brake propelling mechanism.

That arm 13 of the front fork which is adjacent to the balls 63 is removably secured to the member 34 by means of providing on the latter a flange 64 which engages with a flange 65 of complemental shape formed on the said arm 13, the latter having an annularly disposed recess 66 which receives a nut 67, the latter being threadedly mounted on the member 34 as at 68 whereby the nut 67 may be rotated for compressing the adjacent arm 13 against the flange 65 of the member 34 for removably locking the said arm 13 with the member 34, it being understood that the member 34 does not rotate and is prevented from so doing by means of its locked engagement with the adjacent arm 13 of the front fork, the sleeve 35 of the member 34 also holding the steel discs 37 against turning movements.

The front fork 13 adjacent the member 34 is provided with an aperture 69 through its flange 65, said aperture is rectangular or square in plan as indicated by the dotted lines 70 of Figure 3 for receiving the correspondingly shaped shoulder portion 71 of the member 34 which further locks, in use, the member 34 with respect to the adjacent arm 13 of the front fork for preventing rotary movement of the member 34 and steel discs 37, said nut 67 preventing longitudinal movement of the member 34 with respect to the said arm 13.

A detent or lock nut 72 is provided at one end of the hollow stationary sleeve-axle 29 and threadedly engaged therewith and functions to maintain the member 34 in a selected position with respect to the said sleeve-axle 29, said position being adjustable with respect to the sleeve 29.

As thus described it will be understood that in operation at times when the operator rotates the housings 17 with his feet by means of the pedals 19 that said housings revolve for propelling the vehicle or bicycle in a forward direction, said housings communicating a rotary motion and traction to the wheel through the teeth 21 thereof, the motion being applied through said teeth to the pinions 22, said pinions communicating said driving force to the bolt 25 which is journalled in the member 29 the squared ends of said bolt being locked with said pinions, said driving force being applied to the member 56 which is rigidly and threadedly engaged at all times with one of said pinions 22 whereby the member 56 is provided with rotary movement corresponding to the rotary movement of the housings 17 and pedals 19 as the vehicle travels in a forward direction and at this time the clutch teeth 44 and 45 are held in disengagement by means of the worm thread of the member 56 causing the member 46 or collar to be in a retracted position with respect to the discs of the clutch. At this time the spring 49 rotates on the annulus 43, being caused to do so since its end 48 is engaged in the slot 47 of the collar 46. The function of said end 48 of the guide spring 49 is to insure that the teeth 44 of the annulus and the teeth 45 of the collar will become properly meshed together during braking operations.

It will be noted that as thus described an overrunning clutch is provided, whereby at times when the operator does not choose to apply traction force with his feet to the mechanism, that his feet may remain in a stationary position while the vehicle travels forward and that should he desire to apply the brake, he presses downwardly upon one of the pedals in a manner to slightly rotate a housing 17 in a direction reverse to that of a forward traveling or propelling direction of said housing whereby the motion applied in said reversed direction rotates the housing 17 adjacent the head 28 of the bolt 25 sufficient to cause the driver-coupling-sleeve 55 to have a corresponding rotary movement, thereby causing the thread thereof to impart a sliding motion to the clutch collar 46, causing the latter to move towards the discs, the end 48 of the guide spring 49 at this time sliding in the slot of the collar as the latter moves towards the member 43 said motion being continued until such time as the oppositely disposed sets of teeth 44 and 45 mesh with each other, whereby at this time the members 43 and 46 become locked together, a further downward pressure by the foot of the operator on the pedal in said reverse direction causing the member 43 to slide toward the discs and upon the sleeve 35 whereby the discs become compressed and frictionally engaged with respect to each other. It will be understood that at this time the discs which are locked to the sleeve 35 of the member 34 being held stationary by said sleeve and therefore tend to hold the copper discs stationary by means of said friction, said copper discs in turn tending to prevent movement of the wheel since the tangs of said copper discs are engaged in the slots of the hub and tend to prevent rotary movement of the hub for light braking effects and do prevent rotary movement of the wheel in instances where the pedal is reversed downwardly with sufficient force.

The pinions 22 being locked together by means of the bolt-axle 25 are provided with simultaneous corresponding movements thereby, whereby either pedal may be used as a brake pedal and both pedals may remain stationary as the operator may elect and both pedals may be used at the same time for propelling the bicycle by the front wheel thereof.

It will be understood that the copper and steel discs of the clutch provide a refinement of detail and that the device may be changed in minor respects whereby said discs are omitted. Preferably the driver coupling sleeve portion 55 and the driver coupling 56 are formed integral as shown in Figure 3, the sleeve portion of said driver being elongated primarily for carrying its thread 54 and providing room for receiving thereon the laterally shiftable connector or collar 46, said connector being adapted, in one position, to operatively connect said driver with the hub 41 for driving the front wheel of the bicycle and in another position permits said driver to apply a braking force to said hub and wheel. It will also be understood that the parts can be readily so arranged that some thereof can be dispensed with, primarily the multiple discs, without appreciably affecting operation. The sleeve 29 for the axle-bolt or axle-shaft 25 may be maintained stationary with respect to the member 34 by means other than the threads 30 and the lock nut 72, said lock nut and thread being preferably employed. The pinions 22 are preferably enclosed within the housings 17 for preventing grease applied to the teeth 21 of said housings and to the pinions 22 from contacting with the clothing of the operator and it will be further understood that ring gear wheels may be employed in lieu of said enclosed housings if desired.

I claim:—

1. A driving, coasting, and braking mechanism for the front wheel of a bicycle comprising the combination with said wheel, a brake therefor, and a driver with relation to which said wheel can independently rotate between the front forks of said bicycle, of a brake anchoring device anchored to a relatively stationary structural element of the bicycle, a laterally shiftable connector which in one position operatively connects said driver with said wheel for driving the latter and in another position permits said driver to apply said brake, said connector having rotary movement with respect to said driver and said wheel being rotatable with respect to said connector, a threaded operating connection between said driver and said connector, a sleeve carried by said front forks axially disposed with respect to said driver, and means for actuating said driver comprising an axle-bolt journalled in said sleeve, a pinion secured to each end of said bolt at the outer sides of said fork and axially of said wheel, one of said pinions being also secured to said driver, whereby the latter may be driven by either pinion, a ring gear wheel in mesh with each pinion, said gear wheels being oppositely disposed at each side of said forks, a sub axle extending outwardly from the outer side of each said forks for a pivotal mounting of each gear wheel for permitting revoluble movements of said bicycle wheel between said gear wheels, and a pedal carried by each ring gear wheel.

2. A mechanism as specified in claim 1, including a plurality of discs disposed side by side and longitudinally slidable of the hub, alternate discs of said plurality being respectively engaged with the revoluble hub and a relatively stationary element of said mechanism.

3. In a bicycle, mechanism adapted to be selectively connected to a wheel of said bicycle for propelling the bicycle and for applying a braking force to said wheel for decreasing the momentum thereof, mechanism for disconnecting said selective mechanism from said wheel to permit the bicycle to have coasting movement, means for actuating said propelling, braking and disconnecting mechanism, and a stationary sleeve axially disposed with respect to said wheel, said means comprising an axle bolt extending through said sleeve, a pinion secured to each end of said bolt, a pivotally mounted ring gear wheel in mesh with each pinion, and a pedal carried by each ring gear wheel.

4. A propelling, coasting and braking mechanism for the front wheel of a bicycle comprising a hub for said wheel adapted to be disposed between the front forks of said bicycle, a bearing on which said hub is adapted to rotate, said bearing being constructed of two separated aligned parts disposed axially of said hub, one of said parts adapted to be secured to one of said forks for maintaining said part stationary with respect to the other elements of the said mechanism, the other said part adapted to be journalled in the other said fork and constituting a driver adapted to have rotary movement independently of said hub, a sleeve secured to the said stationary part of said hub bearing and axially disposed with respect to said driver, an axle-bolt journalled in said sleeve having ends adapted to extend outwardly of the sides of said forks, a pinion secured to each said end of said axle-bolt, one of said pinions secured to said driver whereby the latter is adapted to be rotated by either pinion, a ring gear wheel provided with a pedal for each pinion, said ring gears adapted to be pivotally mounted at the outer respective sides of the said forks for providing an operative engagement with said pinions, and means for connecting said driver to said hub for selectively communicating driving or braking motion from said pedals to said hub, said hub adapted to rotate on said two part bearing independently of said driver when disconnected therefrom for permitting coasting movements of said hub.

5. In a bicycle, the combination with the front wheel hub, of a rotatable axle, a sleeve bearing for said axle carried by the front forks of said bicycle, a brake mechanism, a driver for the hub and brake mechanism, a two part journal-bearing upon which the hub is adapted to have free rotary movement at times, one of said parts being secured to a front fork of said bicycle and to said axle sleeve bearing for preventing rotary movements of said journal-bearing part and said axle sleeve, the other part of said journal-bearing constituting the said driver, said driver part being journalled upon said sleeve and within the other of said forks, a laterally shiftable, rotatable sleeve-connector mounted upon the driver and having tapered portions, a complementary spiral connection between said sleeve-connector and said driver, said hub having complementary tapered portions for engagement with said tapered portions of the sleeve-connector for causing the driver, sleeve-connector and hub to rotate together simultaneously in one direction at times, said driver adapted to be rotated in a reverse direction for shifting said sleeve-connector free from said hub for applying said brake mechanism to said hub, actuating means for said driver operable from both sides of said bicycle wheel, said actuating means comprising a pinion secured to each end of said rotatable axle, said pinions being disposed at the outer sides of said forks, one of said pinions being also secured to said driver, a gear wheel in mesh with each pinion, said gear wheels being pivotally mounted on stub-axles carried by said forks, said stub axles extending outwardly of the forks for permitting the said bicycle wheel to rotate between said stub axles and forks, and a pedal carried by each gear wheel.

6. A combination as specified in claim 5, in which the brake mechanism thereof is further characterized as including a plurality of aligned discs disposed side by side, said discs adapted to slide longitudinally of the hub, alternate discs of said plurality being respectively engaged with the revoluble hub and with the stationary part of the journal-bearing upon which the hub is adapted to rotate, said discs adapted to frictionally engage each other for releasably securing said hub to said stationary bearing part for a braking operation of said mechanism.

FRED E. WOODARD.